United States Patent [19]

Heddle et al.

[11] Patent Number: 4,858,735

[45] Date of Patent: Aug. 22, 1989

[54] STATIONARY PIVOT MECHANISM FOR USE WITH A DAMPER

[76] Inventors: Richard W. Heddle, 1364 Highway #8; Herbert R. Ruzicka, 339 Winona Road, both of Winona, Canada, L0R 2L0

[21] Appl. No.: 874,647

[22] Filed: Jun. 16, 1986

[30] Foreign Application Priority Data

Jun. 18, 1985 [CA] Canada .................................. 484310

[51] Int. Cl.⁴ ............................................ F16K 31/12
[52] U.S. Cl. ..................................... 188/299; 74/104; 188/319; 251/56; 251/228
[58] Field of Search ................. 188/299, 319; 74/104; 251/56, 228, 263

[56] References Cited

U.S. PATENT DOCUMENTS

| 382,101 | 5/1888 | McKnight | 74/107 |
| 3,570,835 | 3/1971 | McPherson | 74/104 X |
| 3,737,142 | 6/1973 | Boswell et al. | 74/107 X |
| 4,605,198 | 8/1986 | Greiner | 251/58 |

FOREIGN PATENT DOCUMENTS

| 283782 | 4/1915 | Fed. Rep. of Germany | 251/228 |
| 2113325 | 10/1971 | Fed. Rep. of Germany | 251/228 |
| 43-20621 | 7/1968 | Japan | 251/228 |

Primary Examiner—Peter R. Brown
Attorney, Agent, or Firm—Riches, McKenzie & Herbert

[57] ABSTRACT

An improved pivot assembly operable on an air flow controlling disk, initially to move the disk from a closed position over a damper opening to an intermediate open position away from the opening and subsequently to pivot the disk to a fully open position normal to the opening. The assembly includes stationary support plates and carriage plates carrying the disk. The carriage plates are coupled to the support plates by a system including one axle member received in a bore in the carriage plates for movement with the carriage plates dictated by contact of the axle member with camming slots in the support plates. A piston rod to move the carriage plates relative to the support plates is coupled to the axle member.

9 Claims, 5 Drawing Sheets

STATIONARY PIVOT MECHANISM FOR USE WITH A DAMPER

SCOPE OF THE INVENTION

This invention relates to airseal dampers and more particularly to an improved camming assembly operable on an air flow controlling disk, initially, to more the disk from a closed position over a damper opening to an intermediate open position away from the opening and, subsequently, to pivot the disk to a fully open position normal to the opening.

BACKGROUND OF THE INVENTION

Airseal dampers have been proposed which comprise a circular opening with a circular domed disk provided to open and close the opening and thereby control gaseous flow therethrough. In a closed position the disk, which has a diameter greater than that of the opening, lies over the opening parallel to the plane thereof with the outer periphery of the disk in sealing engagement with a forward surface of the frame peripherally about the opening.

In opening the damper, the disk is moved, firstly, forwardly away from the opening while maintaining the disk substantially parallel to the plane of the opening. Once the disk has been moved a desired distance forwardly of the frame, the disk is then pivoted approximately about a diameter of the disk until the disk assumes a position substantially normal to the plane of the opening. Advantageously, portions of the disk will, in the fully open position, extend rearwardly through the opening. The disk may thus be moved forwardly of the opening only so far as is required to permit the disk to pivot to a position normal to the opening without contacting the opening.

Previous mechanisms to move the disk between open and closed positions suffer a number of disadvantages. Such mechanisms have been unduly complex and required an excessive number of machined parts increasing their expense, ease of manufacture and weight. Previous mechanisms have not provided for satisfactory alignment of moving elements with the result of only partial engagement between bearing surfaces and uneven wearing of bearing surfaces. Previous mechanisms have been rather large with the disadvantage of providing excessive restriction of air-flow when positioned in the air flow path. Their large size is a disadvantage during installation.

Accordingly, it is an object of the present invention to at least partially overcome the disadvantages of the previous mechanisms by providing a novel caming assembly to move the disk between its open and closed positions which assembly comprises carriage means coupled to support means for controlled movement of the carriage means with respect to the support means due to the interaction of camming pins fixed on the carriage means and slidable in closed slots in the support means.

In one of its aspects the present invention provides a damping assembly have a circular opening in a planar frame surface and a complementary circular disk marginally greater than the opening to regulate flow of gas through the opening, the disk assuming a first closed position in which the disk lies in the plane of the opening on a first forward side of the opening with the periphery of the disk in sealing engagement with the frame surface surrounding the opening, the disk movable forwardly away from the opening to an intermediate position in which it may be rotated substantially about a diameter of the disk toward a fully open position with the plane of the disk substantially normal to the plane of the opening and with a portion of the disk extending rearwardly through the opening, a camming assembly to move the disk between its open and closed positions, the camming assembly comprising:

support means comprising two substantially identical parallel support plates coupled to the frame surface and extending normal to the plane of the opening rearwardly from approximately the center of the rear of the disk when fully closed, carriage means comprising two substantially identical parallel carriage plates fixedly coupled to the center of the rear of the disk and extending rearwardly normal to the plane of the opening when the disk is fully closed, a side surface of each carriage plate in close sliding juxtaposition to a side surface of one of the support plates to guide the carriage plates on movement rearward and forwardly and maintain the carriage plates parallel with the support plates, each support plate having therethrough a first camming slot and a first bore, each carriage plate having therethrough a second camming slot and a second bore, a first axle member extending between the support plates through the first bores and into the second slots of the carriage plates to be received in slidable camming engagement in each of the second slots, a second axle member extending between the support plates through the first slots of the support plates and into the second bores, the second axle member received in slidable camming engagement in each of the first slots, the second slots located forward of the second bores, each second slot being substantially straight and extending forwardly from a rear end to a forward end, the first bores located proximate the forward end of the support plates, each first slot having a rear end rearward of the first bore, the first slot extending forwardly from its rear end as a first substantially straight slot portion having a length and configuration similar to that of the second slots, the first slot portion merging at its forward extent into a second substantially arcuate slot portion, the center of which describes an arc of a circle centered on the axis of the first bore and having a radius equal to the distance between the center of the rear end of the second slot and the axis of the second bore, the second slot portion extending from the forward extent of the first slot portion forwardly and to one side of the first bore to terminate at the forward end substantially far forward as the first bore, actuating means providing reciprocal forward extension and rearward retraction of a piston rod and coupled to the support means rearward of the first slot for pivotting about an axis parallel to the first and second axle member and normal to the direction the piston rod is extendable and retractable, the piston rod extending between the support plate and coupled at a free forward end to the second axle member, wherein:
(a) with the piston rod fully rearwardly retracted the disk is in a fully closed position with the carriage means drawn as far rearwardly as possible with the second axle member proximate the rear ends of the first slots and with the first axle member proximate the front ends of the second slots, and
(b) upon forward extension of the piston rod from a fully closed position, the piston rod moves the carriage means forwardly substantially in a direction normal to the plane of the opening with the carriage means being guided by the first axle member sliding in the second slots to the rear end thereof at the same time as the second axle member slides in the first slot portions to the forward extent thereof, and upon further forward extension of the piston rod with the first axle member received in the rear end of the second slots, the second axle member slides in the second arcuate slot portions to the forward end thereof thereby pivoting the carriage means about the first axle member so as to pivot the disk to a plane substantially normal to the plane of the opening.

BRIEF DESCRIPTION OF THE DRAWINGS

Further aspects and advantages of the present invention will appear from the following description taken together with the accompanying drawings in which.

Figure 1:
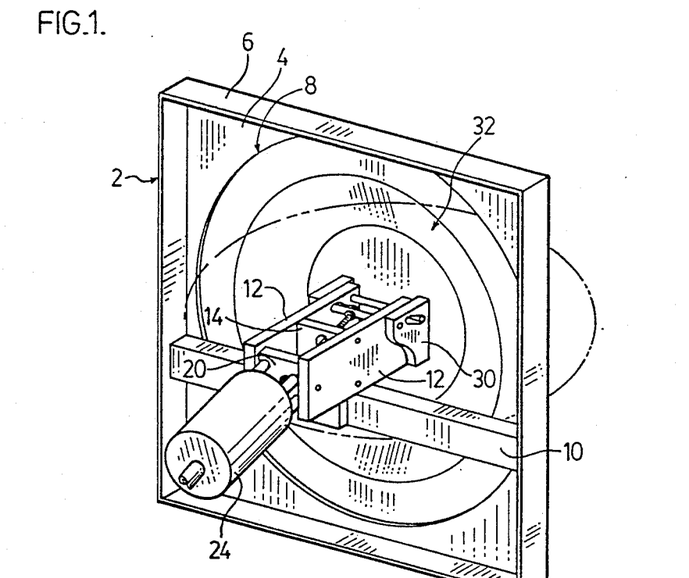
FIG. 1 is a rear perspective view of an air-seal damper including a camming mechanism in accordance with a 1st embodiment of the present invention.
Figure 4:
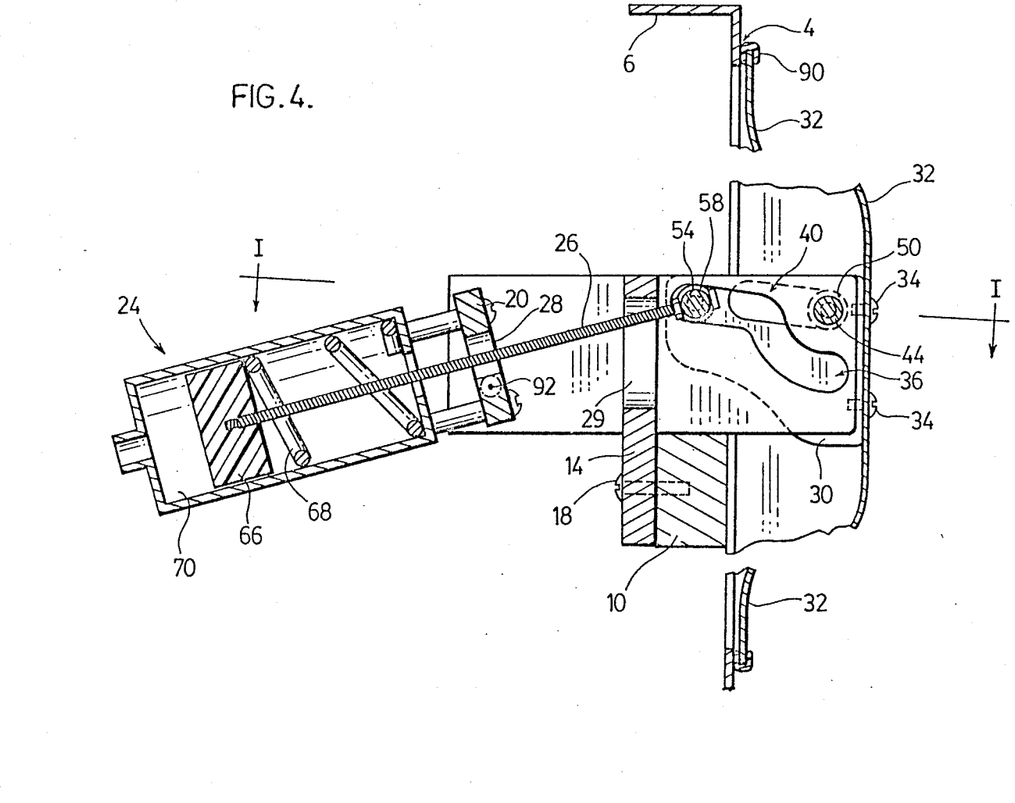
FIG. 4 is a schematic cross-sectional side view of the damper of FIG. 1 along a central vertical plane therethrough with the damper in a fully closed position.

Reference is made first to FIGS. 1 and 4 showing a duct frame 2 with a planar front sheet 4 and a peripheral flange 6. Circular duct opening 8 is provided in front sheet 4. Support rod 10 extends across the opening being coupled at its ends to flange 6.

Support means is mounted on rod 10. The support means includes two spaced parallel support plates 12, and a cross or spacing plate 14 the spacing the plates and coupled thereto by screws 16. Plate 14 mounts the support means to support rod 10 by a lower extension of plate 14 being secured to rod 10 by screws 18.

At the rear end of plates 12, accuator plate 20 is mounted between support plate 12 by screws 22 aligned to permit plate 20 to pivot about an axis normal to support plates 12. An air actuated piston-and-cylinder accuator assembly 24 is mounted on plate 20 with a piston rod 26 thereof passing forwardly through a central apertures 28 and 29 in plates 20 and 14, respectively.

Carriage means are mounted on the forwarded end of the support means. The carriage means includes two spaced parallel carriage plates 30. A marginally forwardly belled or domed, damper disk 32 is carried by the carriage means by being mounted to the forward end of carriage plate 30 by screws 34. Disk 32 has a diameter which is greater than the diameter of opening 8, whereby with the carriage means positioning the disk in a fully closed position as shown in FIG. 1 in solid lines, the peripheral edge of disk contacts the front surface of front sheet 4 to prevent air flow through the opening.

FIG. 1 shows schematically in dotted lines the position disk 32 assumes when in a fully open position.

Figure 2:
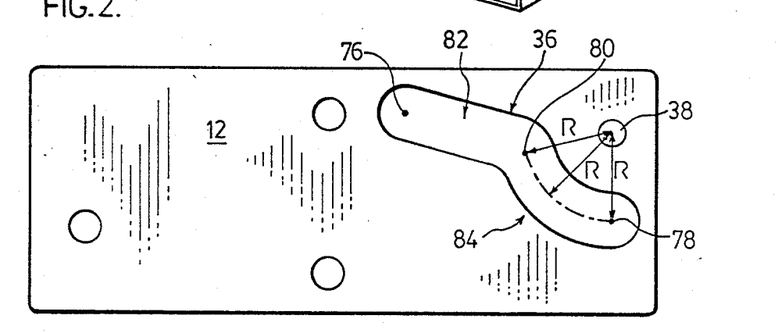
FIGS. 2 and 3 are side views respectively of a support plate and a carriage plate of the camming mechanism shown in FIG. 1.

Both support plates 12 are identical and as shown in FIG. 2 have therethrough a first camming slot 36 and a first bore 38.

Figure 3:
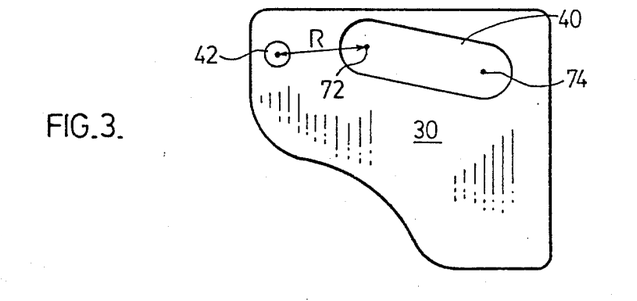

The carriage plates 30 are also identical and as shown in FIG. 3 have therethrough a second camming slot 40 and a second bore 42.

Figure 7:
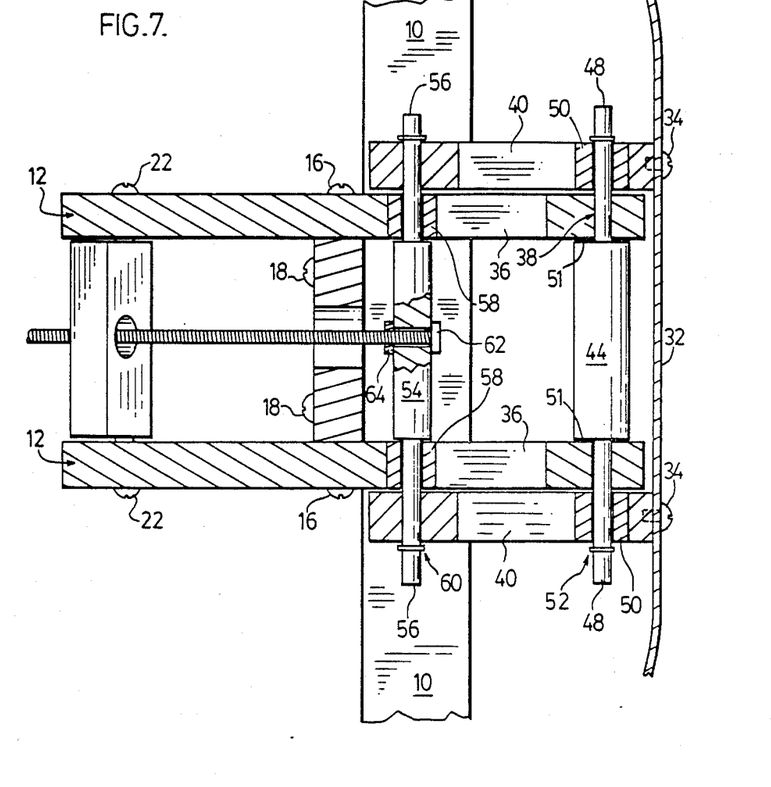
FIG. 7 is a cross-sectional plan view along axis I—I' in FIG. 2.

As best seen in FIG. 7, the support means includes a first axle member 44 having reduced diameter end axle portions 48 passing through first bores 38 of support plates 12 and then through second slots 40 of carriage plates 30. First camming wheels 50 are journalled for rotation about axle portions 48 with the wheels closely received in second slots 40 for rolling engagement with camming interior surfaces of the slots. Shoulders 51 on first axle member 44 accurately space and locate support plates 12 and may be secured thereto for example by axle portions 48 being force fitted into first bores 38. Axle member 44 thus provides stability and rigidity to the support means at its forward end. Sprung snap rings 52 are received in an annular groove in axle portion 48 to retain first wheels 50.

As also seen in FIG. 7, the carriage means includes a second axle member 54 having reduced diameter and axle portions 56 passing through, firstly second cam wheels 58 and then second bores 42 of carriage plates 30. Second cam wheels 58 are journalled for rotation about axle portion 56 with the wheels closely received in first slots 36 for rolling engagement with camming interior surfaces of the slots. Sprung snap rings 60 are received in an annular groove in axle portion 56 to assist in retaining carriage plates 30 thereon.

Piston-rod 26 is coupled at its free forward end to second axle member 54. As shown piston-rod 26 comprises an elongate threaded bolt passing through a bore in second axle member 54 with head 62 on the forward side and a locking nut 64 on the rear side of the second axle member 54. The rear end of piston-rod 26 is shown schematically threaded into a piston 66 biased rearward by spring 68 and movable forward by introduction of compressed air into cylinder chamber 70.

For convenience the first camming wheels 50 and second camming wheels 58 are shown to be of the same diameter. These wheels are to roll along the interior surfaces of their respective slots 40 and 36, and accordingly, the slots have a width marginally greater than the diameters of the wheels. The interior surfaces terminate as shown part-circular surfaces of a diameter marginally greater than the wheels.

Second slot 40 is shown extending forward from its rear end centered on rear point 72 substantially in a straight line to its forward end centered on front point 74. Second bore 42 is located rearward of second slot 40. The distance from rear point 72 to the center of second bore 42 is distance R.

First slot 36 has, a rear end centered on rear point 76 and a forward end centered on front point 78. Point 80 as seen in FIG. 3 shows an intermediate point. First slot 36 extends forwardly from rear point 76 to intermediate point 80 as a substantially straight first slot portion 82 which preferably is of a length and configuration similar to that of second slot 40. First slot 36 extends forwardly from intermediate point 80 to front point 78 as an arcuate second slot portion 84. First bore 38 is shown located close to the forward end of support plate 12. A center line along second slot portion 84 from intermediate point 88 to forward point 78 describes an arc of a circle about the center of bore 38 of radius R equal to the distance between the center of second bore 42 and rear point 72 of second slot 40.

Operation of the camming mechanism of the first embodiment is now described with reference to FIGS. 4, 5 and 6 which show in succession the camming mechanism in fully closed, intermediate and fully open positions, respectively.

FIG. 4 shows a fully closed position with spring 68 drawing piston-rod 26 as far rearwardly as possible with the periphery of disk 32 drawn into sealing engagement with sheet 4. As seen in FIG. 4, a rubber sealing member 90 may be carried on the rim of disk 32 In the fully closed position, preferably, first wheel 50 does not contact the front end of second slot 40 and second wheel 58 does not contact the rear end of first slot 36 as to do so could preclude the force of spring 90 from being transferred to urge disk 32 sealably into front sheet 4. On initial extension of piston-rod 26, by application of pressurized fluid into cylinder chamber 70, piston-rod 26 urges second axle 54 forward thereby moving the carriage means forwardly with the relative movement of the carriage means and support means determined by the simultaneous camming action of slots 36 and 40 on the camming wheels received therein. First wheels 50 roll rearwardly in the second slot 40 as the carriage is urged forwardly at the same time as second wheels 58 roll forwardly in the first slot portion 82 of first slot 36. With second slot 40 and first slot portion 82 having substantially the same configuration and angular orientation, the carriage plates 30 are moved forwardly maintaining disk 32 substantially vertical yet moving its downwardly as seen in the Figures. Such forward movement of the carriage means continues until the rear end of the second slot 40 contacts first wheels 50, being the intermediate position shown in FIG. 5 with first wheels 50 and thereby the center of first bore 38 centered on rear point 72 of second slot 40.

From this intermediate position, further extension of piston rod 26 causes the carriage means to pivot about first wheels 50 and therefore effectively about first axle member 54 and rear point 72. Such rotation, results due to first wheel 50 being retained in engagement with the rear end of second slot 40 while second wheels 58 are urged to travel the arcuate path of second arcuate slot portion 84 of first slot 36 from intermediate point 80 to end point 78, the fully open position shown in FIG. 6 in which movement is stopped by second wheels 50 contacting the front end of first slot 36. In movement from the intermediate position to the fully open position of FIG. 6, the carriage means is rotated about first axle member 44 from a position with disk 32 parallel the plane of opening 8 to a position approximately normal thereto.

On retraction of piston- rod 26, the carriage means reverses its movement moving from fully opened to intermediate to fully closed positions in succession. As desired piston-rod 26 may stop the carriage means at any position between fully opened and fully closed.

Figures 5, 6:
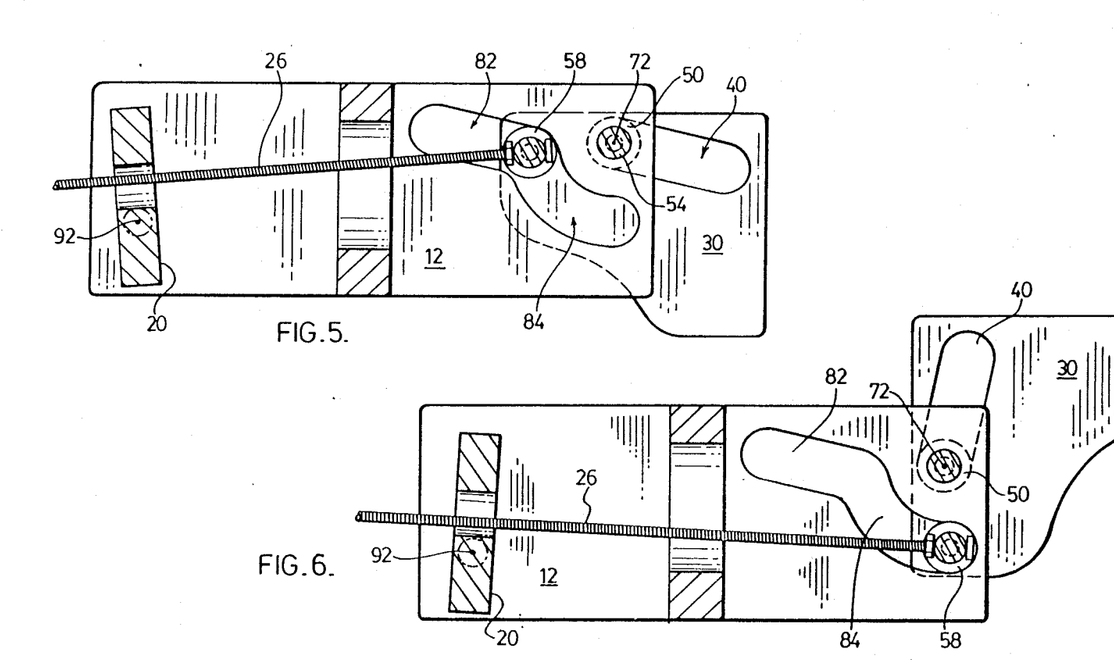
FIGS. 5 and 6 are side views similar to FIG. 2 but showing only portions thereof and with the camming shown respectively, in intermediate and fully open positions.

As seen in FIGS. 5, 6 and 7, during movement of the carriage means piston-and-cylinder assembly 24, plate 20 pivot about screws 22 and thereby an axis through point 92 which axis is parallel to the axis about which the first and second axle members rotate. Suitable choice of pivot point 92 and the angular orientation of cam slots 36 and 40 with respect to the direction forces are applied to the carriage means by piston-rod 26 can ensure desired movement of the carriage means with respect to the support means both during extension and retraction.

Figure 8:
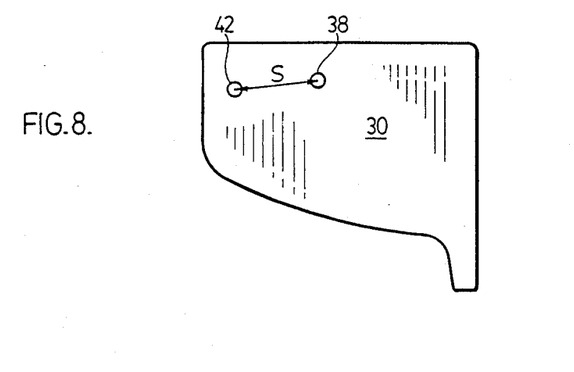
FIGS. 8 and 9 are side views, respectively, of a support plate and carriage plate of a second embodiment of the camming mechanism in accordance with the present invention.
Figure 9:
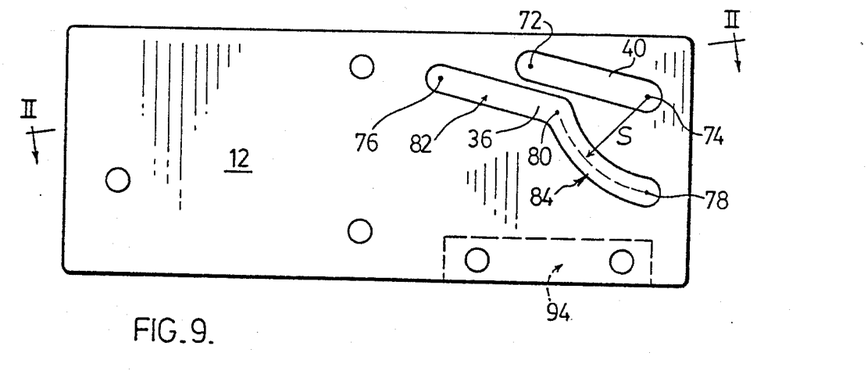
Figure 10:
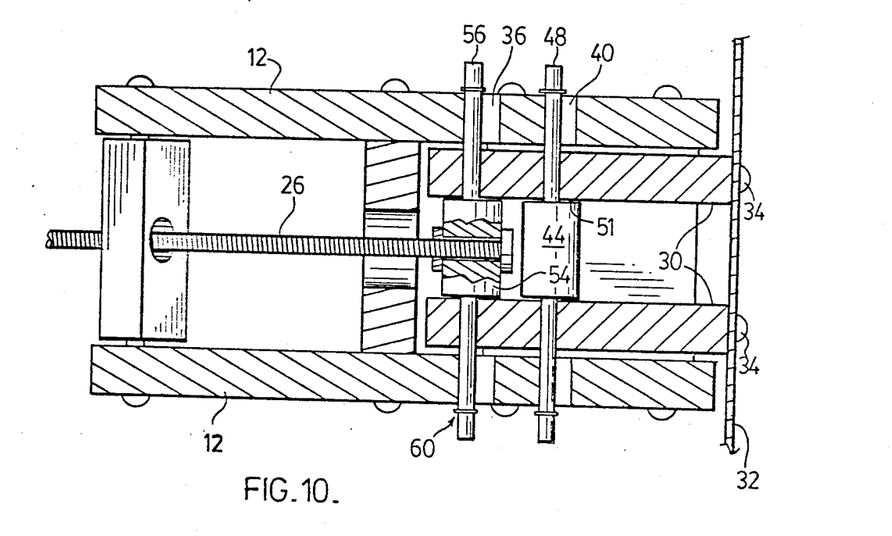
FIG. 10 is a cross-sectional plan view similar to FIG. 3 but along section line II—II' of FIG. 9 in an assembled camming mechanism in accordance with the second embodiment utilizing support and carriage plates shown in FIGS. 9 and 10.

Reference is now made to FIGS. 8, 9 and 10 showing a second embodiment in accordance with the present invention. In FIGS. 8 to 10 similar reference numerals to those in FIGS. 1 to 7 indicate similar elements. In the second embodiment, both first slot 36 and second slot 40 are carried by support plates 12 whereas both the first and second axle members 44 and 54 are fixed in first and second bores 38 and 42 in the carriage members. Axle members 44 and 54 have reduced diameter end portions 48 and 56. The axle members do not carry wheels and end portions 48 and 56 slidably cam on the interior surfaces of the slots. The slots have been reduced in width accordingly. The distance from the center of bore 38 to center of bore 42 is distance S. The distance from front point 74 of second slot 40 to the center line of the second arcuate portion of first slot 36 is also distance S.

In operation, the carriage means is in a fully closed position when the first axle member 44 is near the rear end of second slot 40 and second axle member 54 is near the rear end of first slot 36. On extension of piston-rod 26, the carriage means moves forwardly keeping disk 32 parallel to the plane of opening 8 until first axle member 44 contacts the forward end of second slot 40 whereupon, on further extension, second axle 56 runs in second arcuate slot portion 84, rotating the carriage means about first axle member 44 that is rear point 74.

In FIGS. 7 to 10, carriage plates 30 are shown disposed inside support plates 12, to reduce air restriction when fully open. With shoulders 51 on both axle members and with the end portions 48 and 56 force fitted into the bores in carriage plates 30, the carriage means is secured together as a unit.

Carriage plates 30 of FIG. 8 have an increased out away portion on their lower surface to accomodate an additional cross plate 94 shown in dotted lines in its intended location on support plate 12, to extend between the plates and increase rigidity of the support means.

In both illustrated embodiments, side surface of each carriage plate 30 are located in close sliding, juxtapositioned engagement with the side surfaces of the support plates to guide the carriage means and keep it parallel to the support means on forward and rearward relative movement.

Preferred materials of construction for the support and carriage plates are aluminum metal and zinc based aluminum metals containing about 11% aluminum and 0.75% copper.

While the present invention has been described with reference to two preferred embodiments, it is not so limited. Many modifications and variations will now occur to those skilled in the art. For a definition of the invention reference is made to the appended claims.

What we claim is:

1. In a damping assembly having a circular opening in a planar surface of a frame and a circular disk having a diameter greater than that of the opening to regulate flow of gas through the opening, the circular disk assuming a first closed position in which the disk lies in the plane of the opening on a first forward side of the opening with the periphery of the disk in sealing engagement with the planar surface of the frame surrounding the opening, the disk movable forwardly away from the opening to an intermediate position in which it may be rotated substantially about a diameter of the disk toward a fully open position with the plane of the disk substantially normal to the plane of the opening and with a portion of the disk extending rearwardly through the opening, an improved camming assembly to move the disk between its open and closed positions, the camming assembly comprising:

support means comprising two substantially identical parallel support plates fixed to the frame and extending normal to the plane of the opening rearwardly from approximately the center of the rear of the disk when fully closed, carriage means comprising two substantially identical parallel carriage plates fixedly coupled to the center of the rear of the disk and extending rearwardly normal to the plane of the opening when the disk is fully closed, a side surface of each carriage plate in close sliding juxtaposition with a side surface of one of the support plates to guide the carriage plates on movement rearward and forwardly and maintain the same parallel with the support plates, each support plate having therethrough a first camming slot and a first bore, each carriage plate having therethrough a second camming slot and a second bore, a first axle member received in the first bores and extending between the support plates normal thereto and through the second slots of the carriage plates, a pair of first cam wheels journalled for rotation about the first axle member with one first wheel received in rolling camming engagement in each of the second slots, a second axle member received in the second bores and extending between the carriage plates normal thereto and through the first slots of the support plates, a pair of second cam wheels journalled for rotation about the second axle member with one second wheel received in rolling camming engagement in each of the first slots, the second slots located forward of the second bores, each second slot being substantially straight and extending forwardly from a rear end to a forward end, the first bores located proximate the forward end of the support plates, each first slot having a rear end rearward of the first bore, the first slot extending forwardly from its rear end as a first substantially straight slot portion having a length and configuration similar to that of the second slots, the first slot portion merging at its forward extent into a second substantially arcuate slot portion the center of which describes an arc of a circle centered on the axis of the first bore and having a radius equal to the distance between the center of the rear end of the second slot and the axis of the second bore, the second slot portion extending from the forward extent of the first slot portion forwardly and to one side of the first bore to terminate near the forward end substantially as far forward as the first bore, actuating means providing reciprocal forward extension and rearward retraction of a piston rod and coupled to the support means rearward of the first slot for pivoting about an axis parallel to the first and second axle members and normal to the direction the piston rod is extendable and retractable, the piston rod extending between the support plates and coupled at a free forward end to the second axle wherein:
  a. with the piston rod fully rearwardly retracted the disk is in a fully closed position with the carriage means drawn as far rearwardly as possible with the second wheels proximate the rear ends of the first slots and with the first wheels proximate the front ends of the second slots, and
  b. upon forward extension of the piston rod from a fully closed position, the piston rod moves the carriage means forwardly substantially in a direction normal to the plane of the opening with the carriage means being guided by the first wheels rolling in the second slots to the rear end thereof at the same time as the second wheels roll in the first slot portions to the forward extent thereof, and upon further forward extension of the piston rod with the first wheels received in rear end of the second slots, the second wheels roll in the second arcuate slot portions to the forward end thereof thereby pivoting the carriage means about the first axle member so as to pivot the disk to a plane substantially normal to the plane of the opening.

2. The damping assembly of claim 1 wherein the first and second slots comprise closed slots each having a width marginally greater than the diameter of the second wheels and first wheels, respectively, to be received therein, and the rear ends of the second slots having semicircular end surfaces of a diameter substantially equal to that of the first wheels to be received therein.

3. The damping assembly of claim 2 wherein said piston rod is coupled to said second axle member with the axis of the piston rod normal to the axis of the second axle member, said second axle member journalled for rotation in said second bores.

4. A damping assembly as claimed in claim 1 wherein the support plates are in between the carriage plates.

5. A damping assembly as claimed in claim 1 wherein the carriage plates are in between the support plates.

6. A damping assembly having a circular opening in a planar frame surface and a complementary circular disk marginally greater than the opening to regulate flow of gas through the opening, the disk assuming a first closed position in which the disk lies in the plane of the opening on a first forward side of the opening with the periphery of the disk in sealing engagement with the frame surface surrounding the opening, the disk movable forwardly away from the opening to an intermediate position in which it may be rotated substantially about a diameter of the disk toward a fully open position with the plane of the disk substantially normal to the plane of the opening and with a portion of the disk extending rearwardly through the opening, a camming assembly to move the disk between its open and closed positions, the camming assembly comprising:

support means comprising two substantially identical parallel support plates coupled to the frame surface and extending normal to the plane of the opening rearwardly from approximately the center of the rear of the disk when fully closed, carriage means comprising two substantially identical parallel carriage plates fixedly coupled to the center of the rear of the disk and extending rearwardly normal to the plane of the opening when the disk is fully closed, a side surface of each carriage plate in close sliding juxtaposition with a side surface of one of the support plates to guide the carriage plates on movement rearward and forwardly and maintain the carriage plates parallel with the support plates, each support plate having therethrough a first camming slot and a first bore, each carriage plate having therethrough a second camming slot and a second bore, a first axle member extending between the support plates through the first bores and into the second slots of the carriage plates to be received in slidable camming engagement in each of the second slots, a second axle member extending between the support plates through the first slots of the support plates and into the second bores, the second axle member received in slidable camming engagement in each of the first slots, the second slots located forward of the second bores, each second slot being substantially straight and extending forwardly from a rear end to a forward end, the first bores located proximate the forward end of the support plates, each first slot having a rear end rearward of the first bore, the first slot extending forwardly from its rear end as a first substantially straight slot portion having a length and configuration similar to that of the second slots, the first slot portion merging at its forward extent into a second substantially arcuate slot portion, the center of which describes an arc of a circle centered on the axis of the first bore and having a radius equal to the distance between the center of the rear end of the second slot and the axis of the second bore, the second slot portion extending from the forward extent of the first slot portion forwardly and to one side of the first bore to terminate at a forward end substantially as far forward as the first bore, actuating means providing reciprocal forward extension and rearward retraction of a piston rod and coupled to the support means rearward of the first slot for pivotting about an axis parallel to the first and second axle members and normal to the direction the piston rod is extendable and retractable, the piston rod extending between the support plate and coupled at a free forward end to the second axle member, wherein:

a. with the piston rod fully rearwardly retracted the disk is in a fully closed position with the carriage means drawn as far rearwardly as possible with the second axle member proximate the rear ends of the first slots and with the first axle member proximate the front ends of the second slots, and b. upon forward extension of the piston rod from a fully closed position, the piston rod moves the carriage means forwardly substantially in a direction normal to the plane of the opening with the carriage means being guided by the first axle member sliding in the second slots to the rear end thereof at the same time as the second axle member slides in the first slot portions to the forward extent thereof, and upon further forward extension of the piston rod with the first axle member received in the rear end of second slots, the second axle member slides in the second arcuate slot portions to the forward end thereof thereby pivoting the carriage means about the first axle member so as to pivot the disk to a plane substantially normal to the plane of the opening.

7. The damping assembly of claim 6, wherein the first and second slots comprise closed slots each having a width marginally greater than the diameter of portions of the second and first axle members, respectively, to be received therein, the rear ends of the second slots having semicircular end surfaces of a diameter substantially equal to that of the respective first axle member to be received therein.

8. The damping assembly of claim 7 wherein said piston rod is coupled to said second axle member with the axis of the piston rod normal to the axis of the second axle member, the second axle member journalled for rotation in the second bores.

9. A damping assembly having a circular opening in a planar frame surface and a complementary circular disk marginally greater than the opening to regulate flow of gas through the opening, the disk assuming a first closed position in which the disk lies in the plane of the opening on a first forward side of the opening with the periphery of the disk in sealing engagement with the frame surface surrounding the opening, the disk movable forwardly away from the opening to an intermediate position in which it may be rotated substantially about a diameter of the disk toward a fully open position with the plane of the disk substantially normal to the plane of the opening and with a portion of the disk extending rearwardly through the opening, a camming assembly to move the disk between its open and closed positions, the camming assembly comprising:

support means comprising two substantially identical parallel support plates coupled to the frame surface and extending normal to the plane of the opening rearwardly from approximately the center of the rear of the disk when fully closed, carriage means comprising two substantially identical parallel carriage plates fixedly coupled to the center of the rear of the disk and extending rearwardly normal to the plane of the opening when the disk is fully closed, a side surface of each carriage plate in close sliding juxtaposition with a side surface of one of the support plates to guide the carriage plates on movement rearward and forwardly and maintain the carriage plates parallel with the support plates, each support plate having therethrough a first camming slot and a second camming slot, each carriage plate having therethrough a first bore and a second bore, a first axle member extending between the carriage plates through the first bores and into the first slots of the carriage plates to be received in slidable camming engagement in each of the first slots, a second axle member extending between the carriage plates through the second bores and into the second slots, the second axle member received in slidable camming engagement in each of the second slots, the first bores located proximate the rear end of the carriage plates, the second bores located forward of the first bores, each second slot being substantially straight and extending forwardly from a rear end to a forward end, each first slot having a rear end rearward of the first slot, the first slot extending forwardly from its rear end as a first substantially straight slot portion having a length and configuration similar to that of the second slots, the first slot portion merging at its forward extend into a second substantially arcuate slot portion, the center of which describes an arc of a circle centered on the center of the forward end of the second slot and having a radius equal to the distance between the axis of the first bore and the axis of the second bore, the second slot portion extending from the forward extent of the first slot portion forwardly and to one side of the second slot to terminate at a forward end substantially as far forward as the forward end of the second slot, actuating means providing reciprocal forward extension and rearward retraction of a piston rod and coupled to the support means rearward of the first slot for pivotting about an axis parallel to the first and second axle members and normal to the direction the piston rod is extendable and retractable, the piston rod extending between the support plate and coupled at a free forward end to the first axle member, wherein:
  a. with the piston rod fully rearwardly retracted the disk is in a fully closed position with the carriage means drawn as far rearwardly as possible with the first axle member proximate the rear ends of the first slots and with the second axle member proximate the rear ends of the second slots, and
  b. upon forward extension of the piston rod from a fully closed position, the piston rod moves the carriage means forwardly substantially in a direction normal to the plane of the opening with the carriage means being guided by the second axle member sliding in the second slots to the front end thereof at the same time as the first axle member slides in the first slot portions to the forward extent thereof, and upon further forward extension of the piston rod with the second axle member received in the front end of second slots, the first axle member slides in the second arcuate slot portions to the forward end thereof thereby pivoting the carriage means about the second axle member so as to pivot the disk to a plane substantially normal to the plane of the opening.

* * * * *